US008471177B2

(12) United States Patent
Chaussade et al.

(10) Patent No.: US 8,471,177 B2
(45) Date of Patent: Jun. 25, 2013

(54) HEATED LAMINATED GLASS PANE HAVING AN IMPROVED VISION COMFORT

(75) Inventors: Pierre Chaussade, Orleans (FR); Guillaume Goffin, Orleans (FR); Vincent Legois, La Prieuree (FR)

(73) Assignee: Saint-Gobain Glass France, Courbevoie (FR)

( * ) Notice: Subject to any disclaimer, the term of this patent is extended or adjusted under 35 U.S.C. 154(b) by 370 days.

(21) Appl. No.: 11/994,131

(22) PCT Filed: Jun. 29, 2006

(86) PCT No.: PCT/FR2006/050647
§ 371 (c)(1),
(2), (4) Date: Jul. 10, 2008

(87) PCT Pub. No.: WO2007/003849
PCT Pub. Date: Jan. 11, 2007

(65) Prior Publication Data
US 2008/0318011 A1  Dec. 25, 2008

(30) Foreign Application Priority Data

Jun. 30, 2005  (FR) ..................... 05 51846

(51) Int. Cl.
*B60L 1/02* (2006.01)
*H05B 3/28* (2006.01)
*H05B 3/84* (2006.01)

(52) U.S. Cl.
USPC ............ 219/203; 219/522; 219/541; 219/544

(58) Field of Classification Search
USPC ................. 219/203, 219, 497, 522, 528, 529, 219/536, 543
See application file for complete search history.

(56) References Cited

U.S. PATENT DOCUMENTS

| 2,878,357 | A | * | 3/1959 | Thomson et al. | ............. 338/292 |
|---|---|---|---|---|---|
| 3,491,438 | A |   | 1/1970 | Brittan et al. | |
| 3,794,809 | A |   | 2/1974 | Beck et al. | |
| 4,864,316 | A | * | 9/1989 | Kaoru et al. | .................. 219/203 |
| 5,745,989 | A |   | 5/1998 | Fisher et al. | |
| 5,750,267 | A |   | 5/1998 | Takase et al. | |
| 5,858,496 | A |   | 1/1999 | Fisher et al. | |
| 6,356,376 | B1 | * | 3/2002 | Tonar et al. | .................... 359/267 |
| 6,492,619 | B1 | * | 12/2002 | Sol | ................ 219/203 |
| 6,559,419 | B1 | * | 5/2003 | Sol et al. | ........................ 219/203 |

(Continued)

FOREIGN PATENT DOCUMENTS

| EP | 0 395 301 A1 | 10/1990 |
|---|---|---|
| EP | 0 893 938 A1 | 1/1999 |

(Continued)

*Primary Examiner* — Joseph M Pelham
(74) *Attorney, Agent, or Firm* — Oblon, Spivak, McClelland, Maier & Neustadt, L.L.P.

(57) ABSTRACT

A laminated heated glazing including at least two superposed transparent and mechanically strong substrate panes with interposition of an interlayer made of a transparent plastic between two adjacent panes. The glazing further includes, in its thickness or on the surface, at least one thin transparent conductive film that extends over at least part of the glazing, the film or films being heated for deicing and/or demisting by Joule effect, at least one film having flow separation lines formed by etching to guide current from one band to the other. The width of the flow separation lines is small enough for them to be invisible to the naked eye in the laminated heated glazing.

18 Claims, 2 Drawing Sheets

U.S. PATENT DOCUMENTS

| | | |
|---|---|---|
| 6,734,396 B2 * | 5/2004 | Sol et al. ............. 219/203 |
| 7,132,625 B2 * | 11/2006 | Voeltzel ............. 219/203 |
| 7,964,821 B2 * | 6/2011 | Veerasamy et al. ........ 219/203 |
| 2003/0087048 A1 * | 5/2003 | Chaussade et al. ........ 428/34 |
| 2003/0116551 A1 * | 6/2003 | Sol et al. ............. 219/203 |
| 2004/0065651 A1 | 4/2004 | Voeltzel |
| 2005/0045613 A1 * | 3/2005 | Maeuser et al. ........ 219/203 |
| 2005/0115954 A1 * | 6/2005 | Gerhardinger et al. ...... 219/543 |
| 2008/0203079 A1 * | 8/2008 | Veerasamy et al. ........ 219/203 |

FOREIGN PATENT DOCUMENTS

| | | |
|---|---|---|
| FR | 2 390 882 | 12/1978 |
| GB | 1 206 194 | 9/1970 |
| WO | WO 03105532 A1 * | 12/2003 |

\* cited by examiner

HEATED LAMINATED GLASS PANE HAVING AN IMPROVED VISION COMFORT

BACKGROUND OF THE INVENTION

I. Field of the Invention

The present invention relates to laminated heated glazing comprising at least two superposed transparent and mechanically strong substrate panes with interposition, between two adjacent panes, of an interlayer made of a transparent plastic, said glazing furthermore including, in its thickness or on the surface, at least one thin transparent conductive film that extends over at least part of the glazing, said film or films being heated for the purpose of deicing and/or demisting by the Joule effect, with a heating area between two current leads in the case of a single-phase current supply, or with three heating areas between their own current leads in the case of three-phase current supply, said current leads being placed on the boundary of the glazing and being connected to a current source external to the glazing, at least one thin film having flow separation lines formed by etching, in order to guide the current from one band to another.

II. Description of Related Art

In general, the deicing requires high electric power, of around 70 watts/dm$^2$, whereas the demisting requires lower power, between 15 and 30 watts/dm$^2$.

Examples of such laminated glazing that may be mentioned include vehicle windows, particularly aircraft cockpit windows, a typical (but not limiting) example of the structure and manufacture of which may be described as follows:

Structure:

The glass windows of an aircraft cockpit generally consist of three glass panes A, B, C starting from the exterior of the aircraft, these being joined together by thermoplastic interlayers, especially made of polyvinyl butyral (PVB) or thermoplastic polyurethane (TPU). In general, the internal face of pane A (face 2 when referring to FIG. 1, which will be described later) or the external face of pane B (face 3) is coated with the aforementioned thin heating film, this usually being based on a metal oxide such as $SnO_2$ or ITO (tin-doped indium oxide). The film on face 2 is used for deicing while the film on face 3 is used for demisting the glazing. It should be pointed out that the demisting may also take on pane B as face 4, or on pane C, as face 5. Typically, the thickness of pane A is 3 mm while that of pane B is 5 or 6 mm in the case of an aircraft cockpit side window.

Formation of the Current Lead Bands:

A thin transparent conductive film heats by the Joule effect between current lead bands (electrodes or collectors or busbars) for example based on conductive enamels filled with silver (silver paste), these bands having been deposited on the internal face of pane A or of pane B by screenprinting. They generally have a width of 5 to 10 mm and are, in the case of a single-phase current supply, deposited over the entire length (or the width) of pane A or of pane B, generally a few millimeters from the edge of the window so as not to impede vision. The leads define between them the largest possible heating area relative to the total area of the glass panes, for the purpose of maximum deicing/demisting efficiency. As indicated, with a single-phase supply, there are only two leads. With a three-phase supply, the network comprises three areas with their own leads which may be connected in star connection or in delta connection.

When the window is flat, as very often in the case of windshields, pane A, after cutting and shaping, is semi-toughened in a vertical toughening furnace, the toughening thus breaking the silver enamels.

When the window is curved, pane B, after ???, to form a soft, rounded edge, and bending, it is chemically strengthened so as to increase its modulus of rupture. As an example, the pane made of a glass having a composition that allows chemical strengthening down to a great exchange depth, of greater than 250 microns, (for example, the glass Solidion®) is used. The current leads are screen printed on the glass and then baked at high temperature after the chemical strengthening step.

Formation of a Thin Heating Film:

The next step consists in depositing a thin transparent conductive film on the face of the glass pane provided with its current leads.

In the case of an ITO film in particular, the deposition is advantageously carried out by a PVD (Physical Vapor Deposition) technique which consists in sputtering source material by the ions extracted from a plasma. If the source material, called target, is negatively biased to initiate the plasma, the technique is cathode sputtering. If an electric field is added to the perpendicular magnetic field, so as to increase the ion density in an area close to the cathode, this is called magnetron sputtering. Mention may be made of cathode sputtering with a ceramic ITO target on a "planar magnetron", which deposits ITO over the entire surface of the glass. The glass run speed and magnetron power parameters determine the resistance per square, and therefore the electrical resistance, between ???, relative to the voltage/current supply characteristics of the heated glazing.

Mention may also be made of the pyrolysis thin-film deposition process, in which technique the mixture composed of an organic part and a mineral part is sprayed, using a spray system, onto a glass heated to between 500 and 700° C., especially between 600 and 650° C., the organic part being burnt off and the mineral part remaining on the glass in the form of a thin film. With this technique, an $SnO_2$-based film may in particular be deposited.

It is also possible to deposit the thin films by vacuum evaporation using a Joule effect.

In the most frequent case of nonrectangular glazing, the leads follow the geometry of the glazing and are therefore no longer parallel. The heating network must, in this case, have areas of different local resistance so as to compensate for the variation in distance between means. The filing company has means for calculating and producing intrinsically non-homogeneous networks so as to produce networks of any shape and of homogeneous dissipation, that is to say without cold spots in the sharp corners of the glazing assemblies. This results in particular in the production of curved lines or inflections for the flow separation so as to guide the current, these lines being formed by etching the thin heating film.

In the case of a three-phase supply, thin heating film is also etched so as to separate the heating network into three areas by etching phase separation lines.

Assembly/Autoclaving/Finishing:

To complete the manufacture of the window, pane A, provided with its thin heating film, together with a connection system based on a metal braid bonded to the current leads, is assembled with the other two glass panes, B and C, by means of thermoplastic interlayers, such as PVB or TPU interlayers. The assembly is baked in a vacuum bag within an autoclave at high pressure and high temperature, to give a complete laminated product. The edges of the laminate are sealed by a peripheral encapsulation by means of barrier materials of the polysulfide, ZEE stainless steel and overmolded silicone seal type, so as to allow the window to be fitted into the "aircraft" structure.

When a thin heating film is provided on pane B, such a film is applied before panes A, B and C are joined together.

The problem that arises is that the flow separation lines, which are formed with widths of 0.5 mm by the standard techniques in thin heating films, are visible through the glazing, thereby reducing the visual comfort and aesthetics of the glazing.

BRIEF SUMMARY OF THE INVENTION

To solve this problem, the filing Company has discovered that the widths of the flow lines can be reduced down to the point where they are no longer visible to the naked eye within the glazing, without impairing the proper flow guiding, this reduction in the width being made possible by the use of a laser technique, with the complementary advantage of being able to increase the number of these flow separation lines, hence invisible to the naked eye, and therefore improving the demisting and/or deicing.

One object of the present invention is therefore laminated heated glazing of the type of that defined in the first paragraph of the present description, which is characterized in that the width of said flow separation lines is chosen to be small enough for them to be invisible to the naked eye in the laminated heated glazing.

The flow separation lines each have in particular a width of 0.1 to 0.2 mm.

The flow separation lines are filmed by etching the thin conductive film over a depth that may go as far as the subadjacent film. When the etching does not extend depthwise as far as the bottom of the line, that is to say down to the glass substrate, there therefore remains in this bottom a small film thickness, which promotes better heating homogeneity.

The flow separation lines may be continuous lines or discontinuous lines, for example dotted lines, this being for a better electrical isolation/continuity compromise.

Advantageously, the thin film or at least one thin film having flow separation lines is a demisting film.

Advantageously, the flow separation lines are arranged along substantially parallel lines which are joined approximately at right angles to their respective two current lead bands and which have bends or inflections when the two bands or parts of bands facing each other make an angle between them.

In the case in which the current supply is a three-phase supply, the three heating areas are bounded by two phase separation lines which are drawn approximately parallel to the flow separation lines and are formed by etching, going down to the subjacent film and having a width of 1 to 2 mm, the current lead bands being arranged for star connection or delta connection.

Advantageously, the thin conductive film is a film of tin oxide or a film of tin-doped indium oxide or a film of fluorine-doped tin oxide, each of these films generally having a thickness of 50 to 500 nanometers, or a silver or gold film generally having a thickness of 50 to 200 nanometers.

Generally preferably, the thin conductive film is bounded on its periphery by a line which is closed on itself and also formed by etching, said line enclosing the current lead band and being formed over a depth going down to the subjacent film. The width of this peripheral line is from 1 to 4 mm.

The glazing according to the present invention may in particular consist of side or front window for an aircraft cockpit, characterized in that the laminated structure comprises at least two structural glass panes (panes B and C) which are intended to be fixed in a rebate of the vehicle and are bonded together via a first interlayer made of transparent plastic, at least a third sheet (pane A), especially made of glass, which is not fixed to the rebate and is linked to the structural glass pane that is turned toward the outside (pane B) via a second interlayer made of plastic, at least one thin conductive film being placed within the thickness of the glazing.

Such glazing may include a thin demisting film, the possible positions of the or each demisting film being:
- on pane B, as face turned toward the exterior of the glazing (face 3) or as face turned toward the interior of the glazing (face 4);
- on pane C, as face turned toward the outside of the glazing (face 5).

Such glazing may also include a thin deicing film on pane A, as face turned toward the interior of the glazing (face 2).

The thin conductive film is generally applied by the known means described above on the associated glass layer, which may advantageously be provided with current lead means.

Said current lead means may be placed between the layers of the glazing, which comprise between them the thin conductive film.

The glazing according to the present invention may also include at least one thin functional film other than the heating film, for example a solar protection film or an electrochromic film, several of these thin functional films possibly being in the form of a multilayer stack. In certain cases, for example that of an aircraft cockpit front window, it is possible to have an ITO deicing film on pane A and a demisting film on pane B.

Another subject of the present invention is a process for the fabrication of glazing as defined above, whereby an assembly of transparent substrate panes are joined together by means of transparent plastic interlayers, at least one of these panes being provided with a thin transparent conductive film having flow separation lines and current lead means, characterized in that the flow separation lines are formed by ablation using a YAG laser, such as an Nd:YAG pulsed laser of 1064 nm wavelength, of 20 W pump power and peak power ranging from 2.8 to 110 kW.

Advantageously, the line defining the periphery of the conductive film and, in the case of a three-phase supply, the phase separation lines are formed simultaneously with the flow separation lines.

BRIEF DESCRIPTION OF THE DRAWINGS

To better illustrate the subject matter of the present invention, one particular embodiment thereof will now be described with reference to the appended drawing.

In this drawing.

DETAILED DESCRIPTION OF THE INVENTION

Figure 1:
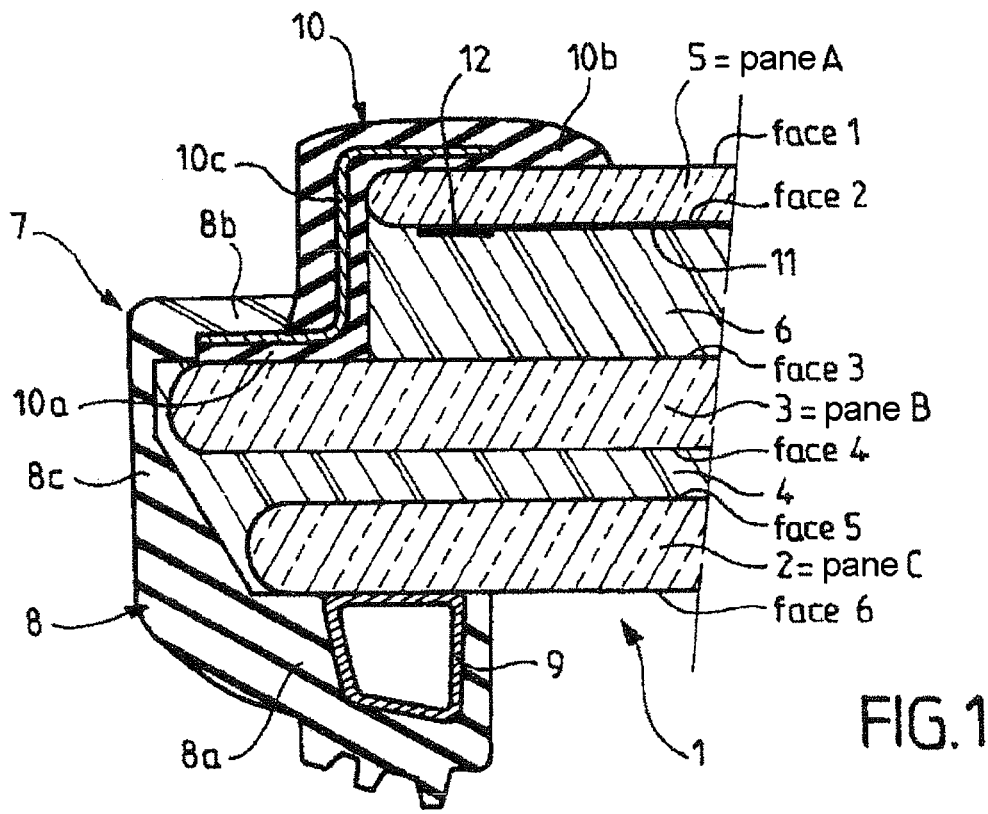
FIG. 1 is a partial view in longitudinal section of laminated heated glazing for an aircraft cockpit according to the invention.

The heated glazing 1 for an aircraft cockpit shown in FIG. 1 comprises, and is known per se, two structural glass sheets 2, 3 that are joined together via an interlayer 4 of transparent thermoplastic, such as PVB or TPU.

The glass sheet 3, which is turned toward the exterior of the cockpit, has a larger area than the glass sheet 2. It is covered, on its exterior face, with a third glass sheet 5 via a second interlayer 6, again made of a transparent plastic such as PVB or TPU.

The sheet 5 is made of chemically strengthened or toughened glass.

The sheet 5 and the interlayer 6 have a smaller area than the structural glass sheet 3. What is therefore formed on the sheets 2 and 3 is a peripheral protruding rim 7 via which the glazing can be fitted into a cockpit rebate (not shown).

A first annular seal 8 made of silicone or fluorosilicone is fixed around said rim 7. The seal 8 has an outline with the general shape of a U having two flanges 8a and 8b joined together by a bottom 8c. The flange 8a is applied against the internal wall of the glass sheet 2, with the interposition of an aluminum shim 9.

The bottom 8c has a variable thickness owing to the fact that the sheet 2 has a smaller area than the sheet 3.

Between the flange 8b and the external face of the glass sheet 3 there is a second annular seal 10 having the form of a ring that is applied against the edge of sheets 5 and 6, having, along one of its borders, a right-angled return 10a toward the exterior, which is applied between the sheet 3 and the flange 8b of the seal 8, and, along the other border, a right-angled return 10b turned toward the interior, which is applied against the external face of the external glass sheet 5.

The seal 10 is reinforced by a metal plate 10c having the same outline as the seal 10 and embedded within the latter.

An electroconductive film or thin conductive heating layer 11 is inserted between the external glass sheet 5 and the interlayer 6. The electroconductive film 11 is transparent and may be made of tin-doped indium oxide or fluorine-doped tin oxide. It has a thickness of 50 nm to 500 nm. The electroconductive film 11 is connected to two current lead bands or collectors 12. These bands 12 are connected to a current source external to the glazing. In FIG. 1, the bands 12 have been shown in the same plane as the electroconductive film 11, but they could also be shifted onto other layers of the glazing.

The electroconductive film 11 and the current lead bands 12 are separated from the inner structural glass sheet 2 by a relatively large thickness of material. It follows that, if the temperature regulation of the glazing were to be disturbed, and that as a consequence short circuits and localized overheating were to appear, there could be damage to those elements of the glazing that are in contact with the conductive film 11, but in no case with the inner glass sheet 2. The glazing thus damaged would be able to withstand the differential pressure existing between the exterior environment and the interior environment.

In accordance with the present invention, flow separation lines 13, which are approximately parallel to one another and intended to guide the current, are formed by laser etching in the film 11. These etching operations are carried out substantially over a width of around 0.1 to 0.2 mm and over part or all of the thickness of the conductive heating layer. These lines may be etched in a discontinuous manner, as indicated above.

Figure 2:
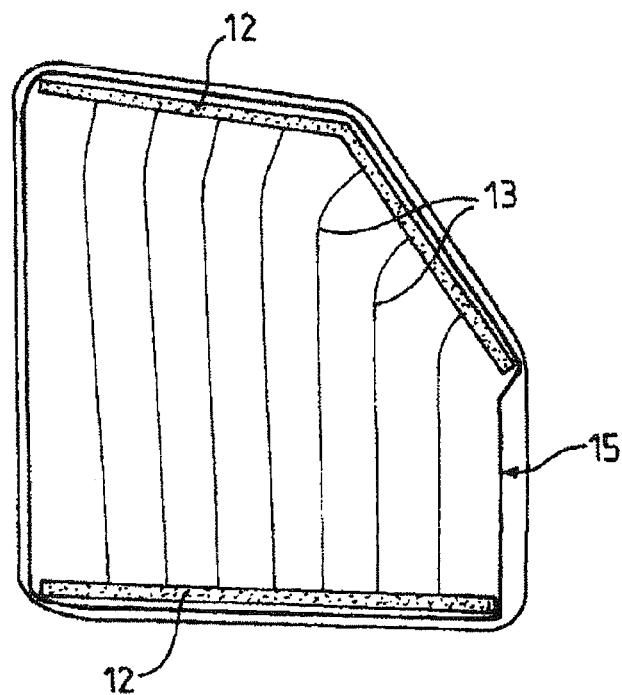
FIG. 2 is a schematic front view of laminated heated glazing according to the invention with a single-phase supply.
Figure 3A:
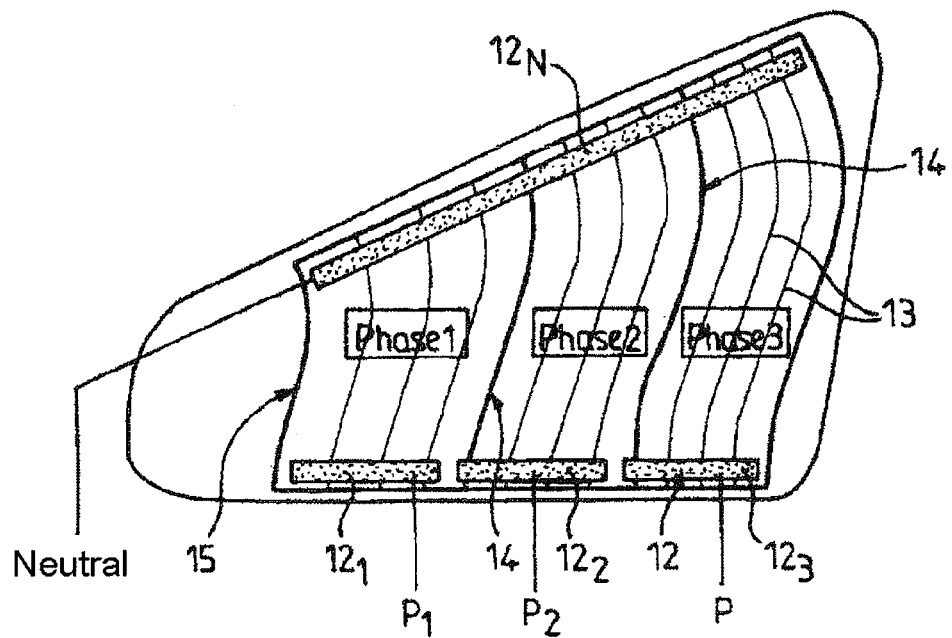
FIGS. 3A and 3B are schematic front views of laminated heated glazing according to the invention with a three-phase supply in star connection and delta connection respectively.
Figure 3B:
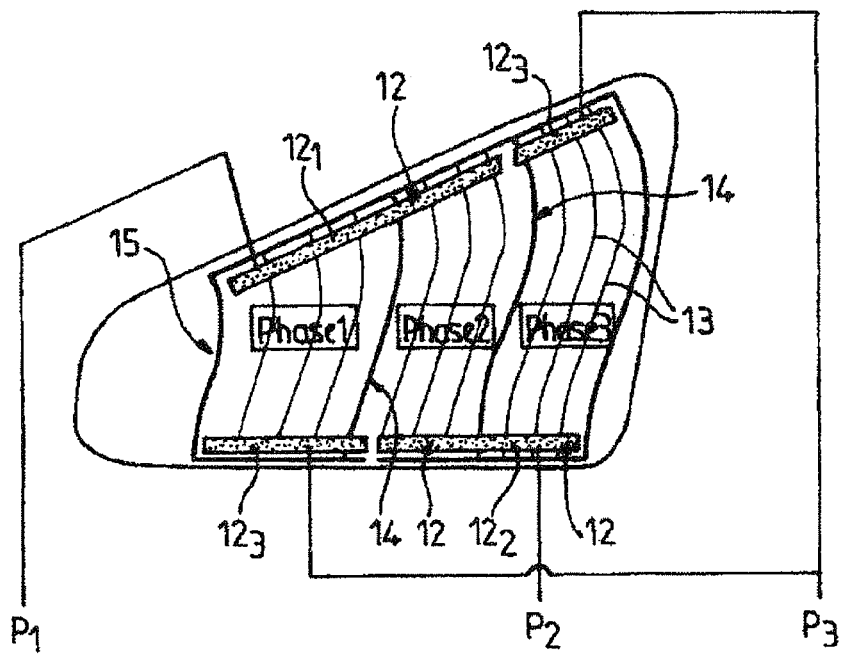

Such flow separation lines are indicated in FIGS. 2 and 3A, 3B by the curves 13, although in reality said lines are invisible. These figures illustrate laminated heating glazing of the type sold for the rear side windows of A300-340 and A380 Airbus airplanes respectively, the window in FIGS. 3A, 3B being shown on a smaller scale than that in FIG. 2.

The window shown in FIG. 2, with a single-phase supply, has a pentagonal shape with, in the fitting position, a horizontal lower border, two vertical lateral borders having two opposed current lead bands 12 extending along the lower horizontal edge and along the opposite edge, which has the form of a broken line.

The window shown in FIGS. 3A, 3B, for a three-phase current supply, has the general shape of a rectangular trapezoid with rounded corners, the two bases of the trapezoid lying along the height direction of the window in the fitted position. The two collectors 12 are placed along the border of the two remaining opposed sides and are arranged as described below.

In both cases, the flow separation lines 13 are connected approximately at right angles to the band 12 and are arranged so that, outside their regions where they are connected to the bands 12, they tend to be parallel to the sides with no band. It follows that these lines in the form with bends (FIG. 2) or inflections (FIGS. 3A, 3B). The path that they follow is precise and calculated by a person skilled in the art, as mentioned above.

Since the window in FIGS. 3A, 3B is supplied with three-phase current, the film 11 also includes two phase separation lines 14, which replace two flow separation lines and are formed in the same way by laser ablation or etching over the entire thickness of the layer 11, but over a width of 0.5 to 2 mm, so as to avoid any possibility of a short circuit between two phases, a high potential difference, whereas the two flow separation lines within the same phase, where there is no risk of a short circuit because of the low potential difference, having a width of 0.1 to 0.2 mm.

In a three-phase arrangement, the leads may be in star connection (FIG. 3A) or in delta connection (FIG. 3B). In the first case, the upper band 12 is connected to the neutral and the lower band is discontinuous, comprising three bands $12_1$, $12_2$ and $12_3$ connected to the phases $P_1$, $P_2$ and $P_3$ respectively.

In the second case, the two upper bands and the lower band are discontinuous, forming, respectively, a band $12_1$ and a band element $12_2$, and the other band element $12_3$ and the band element $12_2$, each band $12_1$, $12_2$ and $12_3$ being connected to the three phases $P_1$, $P_2$ and $P_3$ respectively.

In both the cases that have just been described, the film 11 is bounded on its periphery by a line 15 that is closed on itself and also formed by etching down to the subjacent film and over a width of 1 to 4 mm, the lateral parts of the line 12 being approximately parallel to the flow separation lines 13, and the upper and lower edges being parallel to the edges of the glazing. The line 15 encloses the bands 12.

The manufacture of the glazing described above is the same as that described in the preamble of the present description, with the exception that very narrow flow lines 13 are formed by an ablation method using an Nd:YAG pulsed laser of the Trumpf brand, with a wavelength of 1064 nm, and with a scanner system that allows any pattern to be etched in a window measuring 180×180 mm. It is this scanner that determines the width of the laser etching, by describing a pattern (a circle with a diameter of 0.5 mm, 1, 2 or 4 mm, etc.). This pattern is then guided over the glazing along a precise path by a robot arm (KUKA brand). The piece programs (paths) are stored in the robot, according to a reference coordinate system. This coordinate system must therefore be recreated before the laser treatment of a window—the current leads are in good registration on the glazing/heating area. The mean power of the laser for ablating the ITO is 3.8 W, the peak power being about 18 kW.

The invention claimed is:
1. A laminated heated glazing comprising:
   at least two superposed transparent substrate panes with an interlayer made of a transparent plastic interposed between two adjacent panes;

at least one thin transparent conductive film that continuously extends over at least part of the glazing and disposed on an inside of or on an outer surface of the glazing, the at least one film being heated for deicing and/or demisting by a Joule effect;

a plurality of elongated current leads, each of the current leads being formed of a conductive material and disposed across from each other on a periphery of the glazing and connected to a current source external to the glazing, at least a portion along a length of a first current lead of the plurality of current leads being non-parallel to a least a portion along a length of a second current lead of the plurality of current leads;

a heating area disposed between two of the current leads in a single-phase current supply, or three heating areas disposed between the current leads in a three-phase current supply; and flow separation lines etched in the film connecting the current leads to each other to guide current from one current lead to another, wherein a width of the flow separation lines is small enough for the flow separation lines to be invisible to the naked eye in the laminated heated glazing, and wherein the flow separation lines have an arcuate portion between the non-parallel portions of the first and second current leads facing each other, the flow separation lines having the arcuate portion are configured to prevent cold spots in sharp corners of the glazing due to the non-parallel current leads.

2. The heated glazing as claimed in claim 1, wherein the flow separation lines each have a width of 0.1 to 0.2 mm.

3. The heated glazing as claimed in claim 1, wherein the flow separation lines extend to a depth reaching the subadjacent film.

4. The heated glazing as claimed in claim 1, wherein the flow separation lines are continuous.

5. The heated glazing as claimed in claim 1, wherein the at least one thin film including flow separation lines is a demisting film.

6. The heated glazing as claimed in claim 1, wherein the flow separation lines are substantially parallel to each other and are joined at substantially right angles to the respective two current leads.

7. The heated glazing as claimed in claim 1,
wherein the current supply is a three-phase supply, and
wherein the three heating areas are bounded by two phase separation lines that are drawn approximately parallel to the flow separation lines and having a depth extending to the subjacent film and having a width of 1 to 2 mm, the current leads arranged in a star connection or a delta connection.

8. The glazing as claimed in claim 1, wherein the thin conductive film is a film of tin oxide or a film of tin-doped indium oxide or a film of fluorine-doped tin oxide, each of the films having a thickness of 50 to 500 nanometers, or a silver or gold film having a thickness of 50 to 200 nanometers.

9. The glazing as claimed in claim 1, wherein the thin conductive film is enclosed on a periphery thereof by an enclosing line, the line enclosing the current leads and having a depth extending to the subjacent film.

10. The glazing as claimed in claim 1,
wherein the glazing is configured to be a side or front window of an aircraft cockpit, and
wherein the laminated glazing comprises:
the at least two panes configured to be fixed in a rebate of the aircraft and bonded together via the interlayer made of the transparent plastic,
at least a third pane that is configured not to be fixed to the rebate and is linked to the structural glass pane that is configured to face toward the outside via a second interlayer made of plastic, and
the at least one thin conductive film placed within the inside of the glazing.

11. The glazing as claimed in claim 1, wherein the current leads with a thin conductive film are placed between the layers of the glazing.

12. The heated glazing as claimed in claim 1, wherein in the case of the three-phase current supply, the glazing includes phase separation lines separating an area of one phase of current from an adjacent area of another phase of current, the phase separation lines having a width thicker than the width of the flow separation lines so as to prevent a short circuit between two adjacent phases.

13. A process for fabrication of a glazing, the process comprising:
joining an assembly of at least two transparent substrate panes together with respective transparent plastic interlayers interposed between the panes;
applying at least one thin transparent conductive film having flow separation lines and a plurality of elongated current leads on at least one of the panes, each of the current leads being formed of a conductive material and the thin transparent conductive film being continuous and disposed on an inside or on an outer surface of the glazing and configured to be heated for deicing and/or demisting by a Joule effect; and
forming the flow separation lines within a continuous portion of the film by ablation using a YAG laser, or a Nd:YAG pulsed laser of 1064 nm wavelength, of 20 W pump power and peak power ranging from 2.8 to 110 kW to connect the current leads to each other, the flow separation lines having a width small enough to be invisible to the naked eye,
wherein, at least a portion along a length of a first current lead of the plurality of current leads being non-parallel to a least a portion along a length of a second current lead of the plurality of current leads,
wherein the flow separation lines are substantially parallel to each other and are joined at substantially right angles to the respective two current leads, and
wherein the flow separation lines being curved between the non-parallel portions of the first and second current leads facing each other, the curved flow separation lines preventing cold spots in sharp corners of the glazing due to the non-parallel current leads.

14. The process as claimed in claim 13, wherein a line defining a periphery of the conductive film and, in a case of a three-phase current supply, phase separation lines, are formed simultaneously with the flow separation lines.

15. The process as claimed in claim 13, wherein the thin conductive film is a film of tin oxide or a film of tin-doped indium oxide or a film of fluorine-doped tin oxide, each of the films having a thickness of 50 to 500 nanometers, or a silver or gold film having a thickness of 50 to 200 nanometers.

16. The process as claimed in claim 13, wherein the thin conductive film is enclosed on a periphery thereof by a line etched into the film, the line enclosing the current leads and having a depth extending to the subjacent film.

17. The heated glazing as claimed in claim 9, wherein the enclosing line is formed by etching and has a width of 1 to 4 mm.

18. A laminated heated glazing comprising:

at least two superposed transparent substrate panes with an interlayer made of a transparent plastic interposed between two adjacent panes;

at least one thin transparent conductive film that continuously extends over at least part of the glazing and disposed on an inside of or on an outer surface of the glazing, the at least one film being heated for deicing and/or demisting by a Joule effect;

a plurality of elongated current leads, each of the current leads being formed of a conductive material and disposed across from each other on a periphery of the glazing and connected to a current source external to the glazing, at least a portion along a length of a first current lead of the plurality of current leads being non-parallel to a least a portion along a length of a second current lead of the plurality of current leads;

a heating area disposed between two of the current leads in a single-phase current supply, or three heating areas disposed between the current leads in a three-phase current supply; and flow separation lines etched in the film connecting the current leads to each other to guide current from one current lead to another, wherein a width of the flow separation lines is small enough for the flow separation lines to be invisible to the naked eye in the laminated heated glazing, and wherein the flow separation lines are curved between the non-parallel portions of the first and second current leads such that the flow separation lines are substantially parallel to each other and are joined at substantially right angles to the respective two current leads, the curved flow separation lines preventing cold spots in sharp corners of the glazing due to the non-parallel current leads.

* * * * *